US009001381B2

(12) United States Patent
Lee

(10) Patent No.: US 9,001,381 B2
(45) Date of Patent: Apr. 7, 2015

(54) IMAGE FORMING APPARATUS WHICH PROCESSES PRINTING DATA INCLUDING A TRANSPARENCY PATTERN, PRINTING CONTROL TERMINAL APPARATUS, AND IMAGE FORMING METHOD THEREOF

(75) Inventor: Hae-kee Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 557 days.

(21) Appl. No.: 13/231,369

(22) Filed: Sep. 13, 2011

(65) Prior Publication Data

US 2012/0062916 A1 Mar. 15, 2012

(30) Foreign Application Priority Data

Sep. 14, 2010 (KR) ........................ 10-2010-0089962

(51) Int. Cl.
*H04N 1/40* (2006.01)
*H04N 1/56* (2006.01)
*G06K 15/02* (2006.01)
*G06T 5/00* (2006.01)
*H04N 1/58* (2006.01)
*G06F 3/12* (2006.01)

(52) U.S. Cl.
CPC ................ *H04N 1/58* (2013.01); *G06F 3/1208* (2013.01); *G06F 3/1247* (2013.01)

(58) Field of Classification Search
None
See application file for complete search history.

(56) References Cited

U.S. PATENT DOCUMENTS

| 2004/0085321 | A1 | 5/2004 | Oka et al. | |
| 2005/0213160 | A1* | 9/2005 | Namikata | 358/3.27 |
| 2006/0290767 | A1* | 12/2006 | Tezuka et al. | 347/115 |
| 2007/0075943 | A1* | 4/2007 | Shin et al. | 345/84 |
| 2008/0025557 | A1 | 1/2008 | Fujiwara et al. | |
| 2009/0225373 | A1* | 9/2009 | Moriwaki | 358/3.27 |

FOREIGN PATENT DOCUMENTS

| JP | 2000-285256 | | 10/2000 | |
| JP | 2002-330289 | * | 11/2002 | ............. H04N 1/405 |
| JP | 2002-369008 | | 12/2002 | |
| JP | 2010-004137 | * | 1/2010 | ............... H04N 1/40 |

OTHER PUBLICATIONS

English translation for JP2010-004137, 26 pages.*
English translation for JP2002-330289, 12 pages.*
European Search Report dated Sep. 12, 2013 issued in EP Application No. 11181093.3.
Lance Williams, "Pyramidal Parameters", Computer Graphics Laboratory New York Institute of Technology, vol. 17, No. 3, Jul. 1983, XP002086498.

* cited by examiner

*Primary Examiner* — Scott A Rogers
(74) *Attorney, Agent, or Firm* — Staas & Halsey LLP

(57) ABSTRACT

An image forming apparatus and a printing control terminal apparatus include an input unit to receive printing data, a rendering unit to transform the printing data into bitmap data, an image processor to determine whether the bitmap data includes a transparency pattern and if it is determined that the bitmap data includes the transparency pattern, perform smoothing processing with respect to the bitmap data; and an output unit to output the bitmap data processed by the image processor. Accordingly, an image quality of printing data including a transparency pattern can be improved. In addition, an image forming method includes receiving image data including a plurality of pixels, determining whether an area of pixels is a patterned area including a pattern, determining the patterned area is transparent when the pattern of the patterned area matches a pre-stored pattern, performing a smoothing process on the patterned area, and printing the image data after performing the smoothing.

18 Claims, 15 Drawing Sheets

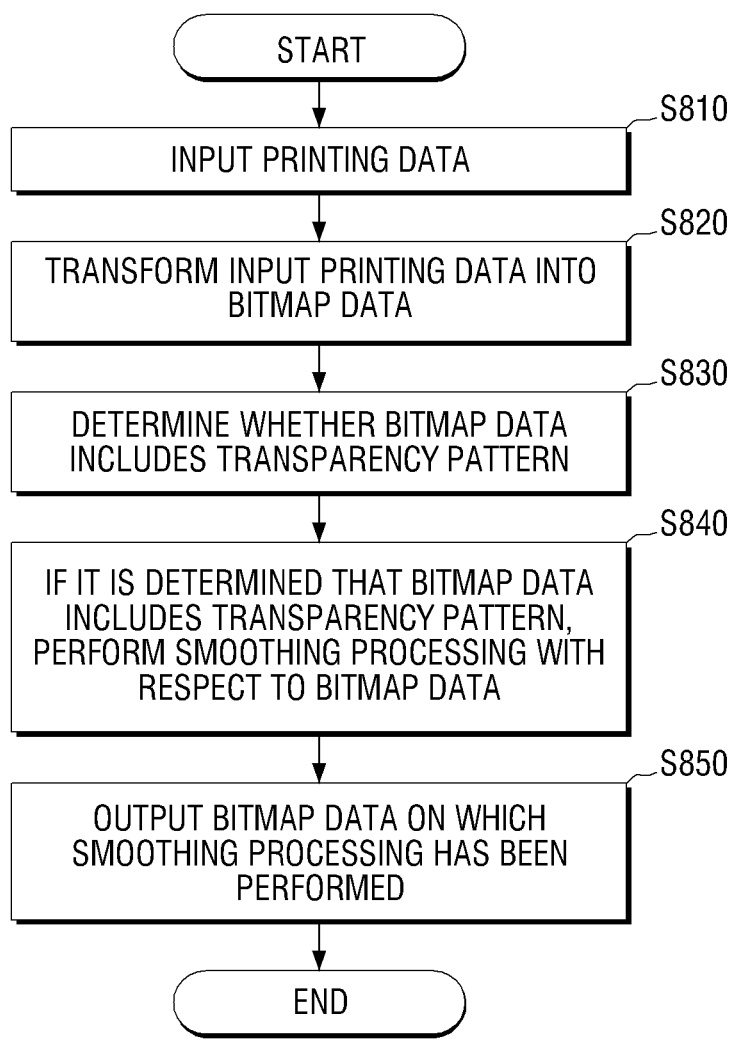

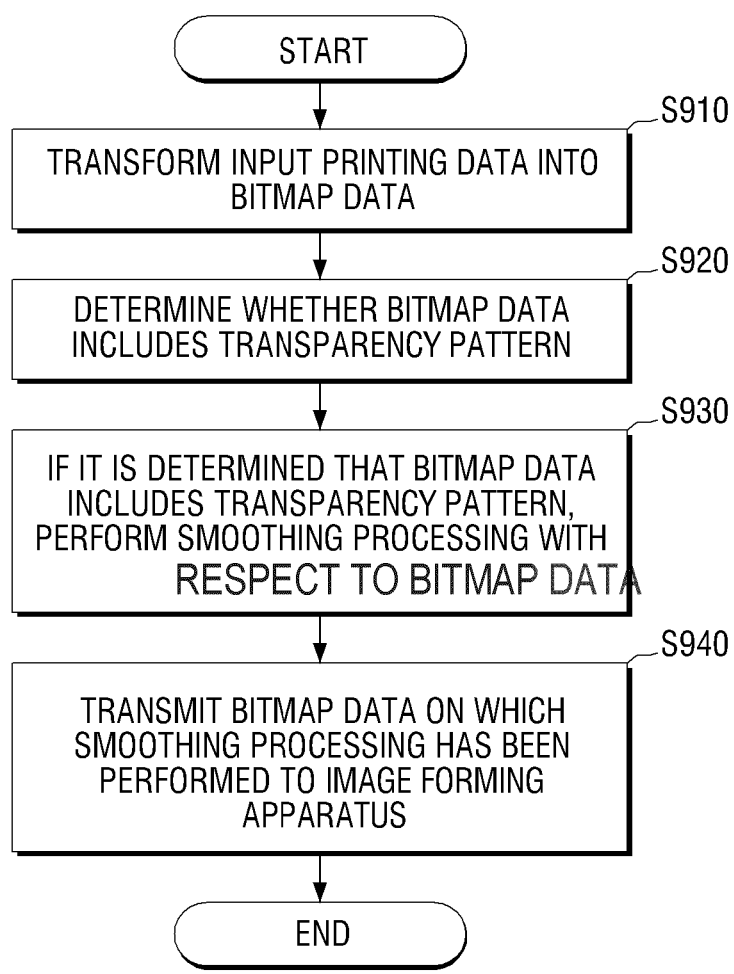

IMAGE FORMING APPARATUS WHICH PROCESSES PRINTING DATA INCLUDING A TRANSPARENCY PATTERN, PRINTING CONTROL TERMINAL APPARATUS, AND IMAGE FORMING METHOD THEREOF

CROSS-REFERENCE TO RELATED APPLICATIONS

This application claims priority under 35 U.S.C. §119(a) from under 35 U.S.C. §119 from Korean Patent Application No. 10-2010-0089962, filed on Sep. 14, 2010, in the Korean Intellectual Property Office, the disclosure of which is incorporated herein by reference in its entirety.

BACKGROUND

1. Field of the Invention

The present general inventive concept generally relates to an image forming apparatus, a printing control terminal apparatus, and an image forming method thereof, and more particularly, to an image forming apparatus which processes printing data including a transparency pattern, a printing control terminal apparatus, and an image forming method thereof.

2. Description of the Related Art

In general, if a user performs printing through an application program in a personal computer (PC), the user edits and prints an image displayed on a monitor of the PC. Here, the user wants to print the image as it is displayed on the monitor through a printer. However, an image which is actually displayed on the monitor appears slightly different from a printed image due to several characteristics of a printer apparatus and several causes such as a color reproduction characteristic difference between the monitor and a printer and the like. This slight difference between the actually displayed image and the printed image occurs due to a difference occurring when the PC transmits documents and pictures made in the application program to the monitor and the printer, besides the physical color reproduction characteristic difference between the monitor and the printer.

For example, if a user adds a box graphic in the application program, the application program has vector information regarding the box graphic. This vector information is seen as a picture on the monitor through a rendering process of a graphic engine. Rendering refers to a process of drawing and showing vector information to express a graphic as an actual picture.

The graphic engine, which shows a document of the application program on the monitor, performs rendering in consideration of characteristics of the monitor, i.e., a physical color reproduction characteristic of the monitor.

If printing is performed in the application program using a printer apparatus not the monitor, a driver or a Printer Command Language (PCL) or a PS emulation performs this rendering process. Here, the rendering process is performed differently in consideration of characteristics of a final output apparatus, i.e., characteristics of the monitor and the printer. An image which is actually displayed on the monitor appears differently from a printed image due to the different performances of the rendering process.

In particular, when a transparency is reproduced in a specific application program, a difference frequently occurs in the reproduction of the transparency. In more detail, a pattern, which is used by a conventional application program to reproduce a transparency, frequently causes the deterioration of an image in an actually printed result. As described above, a monitor is an apparatus which can express an alpha blending (α-blending) result thereon as it is. However, a printer goes through a color transformation process of transforming an RGB color used by the monitor into a CMYK toner color and then halftoning to be printed by a printer apparatus in order to obtain printing data which is to be printed.

Accordingly, if α-blending processing is not performed with respect to color information of an object whose transparency has been set, but the color information is handed over as a pattern format, and the transparency of the object is to be reproduced when a driver is performing a rendering process, an actually printed image may be deteriorated differently from a transparency image that a user wants to output and edit on a monitor. In general, since a printer apparatus cannot perform printing without performing halftoning, the printer apparatus deteriorates an image quality of an incoming pattern format image.

SUMMARY

The present general inventive concept provides an image forming apparatus which can reduce the deterioration of an image quality resulting from a set-up of a transparency pattern, a printing control terminal apparatus, and an image forming method thereof.

Additional features and utilities of the present general inventive concept will be set forth in part in the description which follows and, in part, will be obvious from the description, or may be learned by practice of the present general inventive concept.

The foregoing and/or other features and utilities of the present general inventive concept may be achieved by an image forming apparatus, including: an input unit to receive printing data; a rendering unit; an image processor to transform the printing data into bitmap data and to determine whether the bitmap data includes a transparency pattern, and if it is determined that the bitmap data includes the transparency pattern, perform a smoothing processing with respect to the bitmap data; and an output unit to output the bitmap data processed by the image processor.

The image forming apparatus may further include a storage unit to store a plurality of pieces of preset transparency pattern information in a lookup table (LUT).

The image processor may include: a transparency pattern matcher to respectively compare pattern formats of predetermined pixel areas of the bitmap data with the plurality of pieces of preset transparency pattern information; a transparency pattern determiner to determine whether a corresponding pixel area includes the preset transparency pattern, based on the comparison result; and a smoothing processor to perform smoothing processing with respect to the corresponding pixel area which has been determined that it includes the preset transparency pattern.

The preset transparency pattern information may be a window pattern of a preset size which has a transparency pattern format which is reproduced according to a preset transparency rate and is pre-analyzed, wherein the transparency pattern matcher selects an adjacent pixel area based on a pixel which is to be currently processed to determine whether the adjacent pixel area corresponds to the window pattern.

The smoothing processing may be to change a pixel value of the corresponding pixel area into an average value of pixel values of pixel areas corresponding to the window pattern.

The image processor may further include: a color space transformer to transform the bitmap data of an RGB color space into data of a CMYK color space, wherein the transparency pattern matcher performs transparency pattern matching with respect to each channel of the data of the CMYK color space.

The foregoing and/or other features and utilities of the present general inventive concept may also be achieved by a printing control terminal apparatus which is connected to an image forming apparatus, including: a rendering unit to transform input printing data into bitmap data; an image processor to determine whether the bitmap data includes a transparency pattern and if it is determined that the bitmap data includes the transparency pattern, perform smoothing processing with respect to the bitmap data; and a communication interface unit to transmit the bitmap data processed by the image processor to the image forming apparatus.

The printing control terminal apparatus may further include: a storage unit to store a plurality of pieces of preset transparency pattern information in a LUT, wherein the image processor includes: a transparency pattern matcher to respectively compare pattern formats of predetermined pixel areas of the bitmap data with the plurality of pieces of preset transparency pattern information; a transparency pattern determiner to determine whether a corresponding pixel area includes the preset transparency pattern, based on the comparison result; and a smoothing processor to perform smoothing processing with respect to the corresponding pixel area which has been determined that it includes the preset transparency pattern.

The preset transparency pattern information may be a window pattern of a preset size which has a transparency pattern format which is reproduced according to a preset transparency rate and is pre-analyzed, wherein the transparency pattern matcher selects an adjacent pixel area based on a pixel which is to be currently processed to determine whether the adjacent pixel area corresponds to the window pattern.

The smoothing processing may be to change a pixel value of the corresponding pixel area into an average value of pixel values of pixel areas corresponding to the window pattern.

The foregoing and/or other features and utilities of the present general inventive concept may be achieved by an image forming method of an image forming apparatus, including: receiving printing data; transforming the printing data into bitmap data; determining whether the bitmap data includes a transparency pattern and if it is determined that the bitmap data includes the transparency pattern, performing smoothing processing with respect to the bitmap data; and outputting the bitmap data on which the smoothing processing has been performed.

The image forming method may further include storing a plurality of pieces of preset transparency pattern information in a LUT.

The performance of the smoothing processing may include: respectively comparing pattern formats of predetermined pixel areas of the bitmap data with the plurality of pieces of preset transparency pattern information; determining whether a corresponding pixel area includes the preset transparency pattern, based on the comparison result; and performing smoothing processing with respect to the corresponding pixel area which has been determined that it includes the preset transparency pattern.

The preset transparency pattern information may be a window pattern of a preset size which has a transparency pattern format which is reproduced according to a preset transparency rate and is pre-analyzed, wherein the comparison includes selecting an adjacent pixel area based on a pixel which is to be currently processed to determine whether the adjacent pixel area corresponds to the window pattern.

The smoothing processing may be to change a pixel value of the corresponding pixel area into an average value of pixel values of pixel areas corresponding to the window pattern.

The performance of the smoothing processing may include transforming bitmap RGB data into CMYK data, wherein the comparison includes performing transparency pattern matching with respect to each channel of the CMYK data.

The foregoing and/or other features and utilities of the present general inventive concept may be achieved by an image forming method of a printing control terminal apparatus which is connected to an image forming apparatus, including: transforming input printing data into bitmap data; determining whether the bitmap data includes a transparency pattern and if it is determined that the bitmap data includes the transparency pattern, performing smoothing processing with respect to the bitmap data; and transmitting the bitmap data on which the smoothing processing has been performed to the image forming apparatus.

The image forming method may further include storing a plurality of pieces of preset transparency pattern information in a LUT, wherein the performance of the smoothing processing includes: respectively comparing pattern formats of predetermined pixel areas of the bitmap data with the plurality of pieces of preset transparency pattern information; determining whether a corresponding pixel area includes the preset transparency pattern, based on the comparison result; and performing smoothing processing with respect to the corresponding pixel area which has been determined that it includes the preset transparency pattern.

The preset transparency pattern information may be a window pattern of a preset size which has a transparency pattern format which is reproduced according to a preset transparency rate and is pre-analyzed, wherein the comparison includes selecting an adjacent pixel area based on a pixel which is to be currently processed to determine whether the adjacent pixel area corresponds to the window pattern.

The smoothing processing may be to change a pixel value of the corresponding pixel area into an average value of pixel values of pixel areas corresponding to the window pattern.

As described above, according to various exemplary embodiments, a deterioration of an image quality of printing data including a transparency pattern can be reduced.

In another feature of the present general inventive concept, a printer comprises an image input module that converts image data into bitmap data including an upper object and a lower object each having a plurality of pixels to be printed and receives pattern information corresponding to at least one of the upper and lower objects, and an image processor to adjust a transparency of a predetermined number of pixels of the upper object based on the received pattern information.

In still another feature of the present general inventive concept, an image forming method of a printer includes receiving bitmap data including a plurality of pixels from an externally connected device, determining whether an area of pixels among the plurality of pixels is a patterned area including a pattern, determining the patterned area is transparent when the pattern of the patterned area matches a pre-stored pattern stored in a memory of the printer, performing a smoothing process on the patterned area, and printing the bitmap data after performing the smoothing.

The printer may further include a memory unit that stores a plurality of pattern information, wherein the image processor determines whether the received pattern information matches a pre-stored pattern information among the plurality of pattern information stored in the memory and applies the pre-stored pattern information to a transparent area of the upper object when the received pattern information matches the pre-stored pattern information.

The image processor of the printer may perform smoothing the transparent area after applying the pre-stored pattern information and print the smoothed binary data.

BRIEF DESCRIPTION OF THE DRAWINGS

The above and/or other features of the present general inventive concept will become apparent and more readily appreciated from the following description of the exemplary embodiments, taken in conjunction with the accompanying drawings, in which:

FIG. 8 is a flowchart illustrating an image forming method of an image forming apparatus according to an exemplary embodiment; and FIG. 9 is a flowchart illustrating an image forming method of a host device according to an exemplary embodiment.

DETAILED DESCRIPTION OF THE EMBODIMENTS

Figure 1:
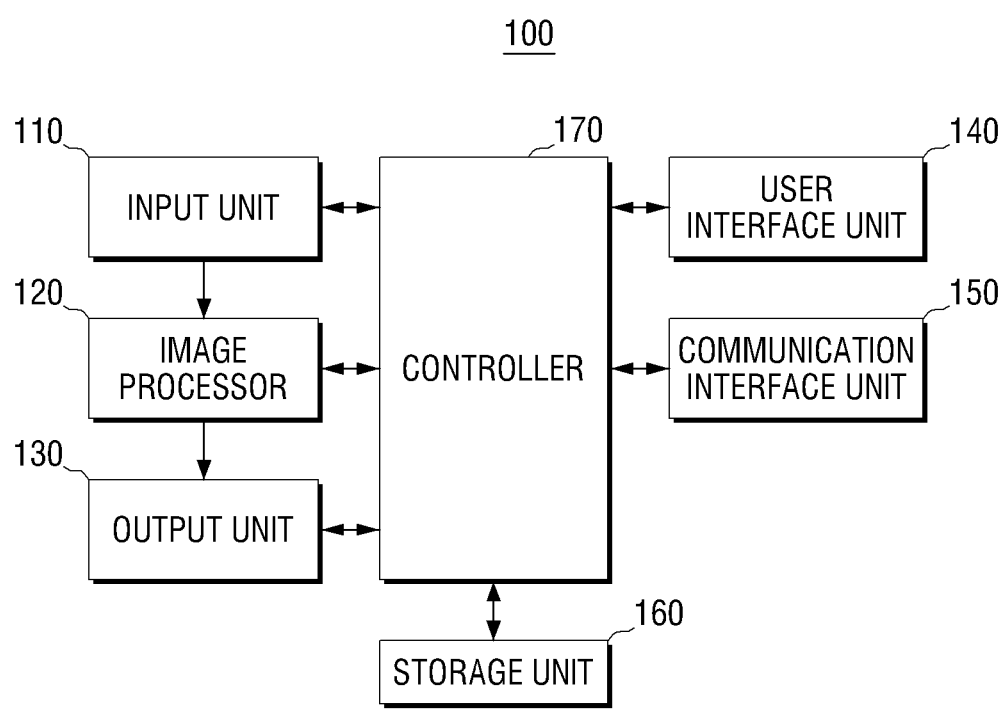
FIG. 1 is a block diagram illustrating a structure of an image forming apparatus according to an exemplary embodiment.

Reference will now be made in detail to exemplary embodiments of the present general inventive concept, examples of which are illustrated in the accompanying drawings, wherein like reference numerals refer to the like elements throughout. The exemplary embodiments are described below in order to explain the present general inventive concept by referring to the figures.

FIG. 1 is a block diagram illustrating a structure of an image forming apparatus 100 according to an exemplary embodiment.

Referring to FIG. 1, the image forming apparatus 100 includes an input unit 110, a rendering unit (not shown), an image processor 120, an output unit 130, a user interface unit 140, a communication interface unit 150, a storage unit 160, and a controller 170.

The image forming apparatus 100 is connected to an external device, supports a resource saving mode, and outputs document data and may be realized in various forms such as a printer, a scanner, a copier, a fax machine, a multifunction peripheral having at least two or more of functions of the printer, the scanner, the copier, and the fax machine, etc.

The input unit 110 receives image data to be image processed.

In more detail, the input unit 110 receives and generates a printing image and/or a scan image. In other words, the input unit 110 receives an image which is generated through an application program or a driver of a host device (not shown) or an RGB rendering image which is generated through an emulation or the like. In the case of copying, the input unit 110 receives a scan image which is scanned by an RGB sensor. In the present exemplary embodiment, for convenience of explanation, the image forming apparatus 100 receives the image which is generated through the application program or the driver of the host device.

Figure 4:
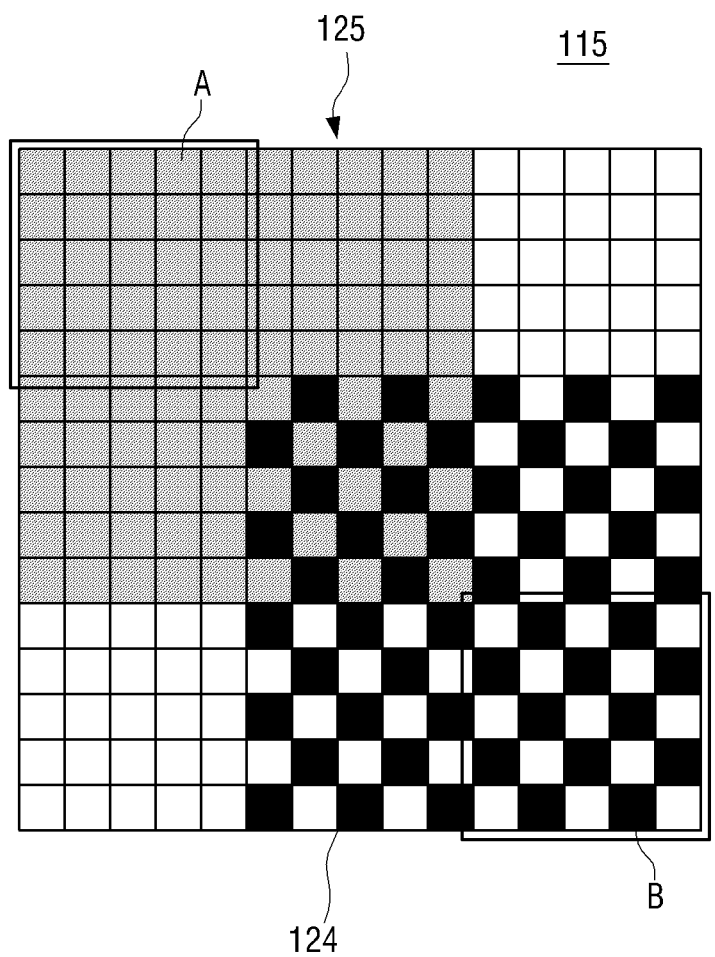
FIG. 4 is a view illustrating transparency pattern matching and determining methods according to an exemplary embodiment.

More specifically, the image processor 120 receives an image and transforms the image input through the input unit 110 into bitmap data 115, e.g., as shown in FIG. 4, of an RGB color space. That is, the image generated by the host device is received by the image processor 120 of the image forming apparatus 100, and the image is converted into a digital bitmap image format that may be further processed by the image processor 120.

Accordingly, the image processor 120 performs image processing with respect to the bitmap data 115 under control of the controller 170.

For example, the image processor 120 may transform a bitmap 8-bit RGB image into a CMYK image through a color transformation, performs image quality improvement with respect to the CMYK image, and generates the CMYK image as a 1-bit image (a binary image) through halftoning.

The image processor 120 transforms an RGB color used by a monitor into a CMYK toner color used by the image forming apparatus 100.

The image processor 120 may also perform various types of image quality improvement processing, such as blurring, trapping, sharpening, edge enhancement, etc., with respect to a CMYK toner color image.

In particular, the image processor 120 performs transparency pattern matching with respect to the bitmap CMYK image to determine whether the CMYK image includes a transparency pattern, and performs smoothing processing with respect to a pixel area including the transparency pattern.

In more detail, the image processor 120 transforms bitmap RGB data into CMYK data, compares pattern formats of pixel areas of the CMYK data with one another, and determines whether a corresponding pixel area includes a preset transparency pattern, based on the comparison result, as discussed in greater detail below.

The image processor 120 performs smoothing processing with respect to the corresponding pixel area which has been determined that it includes the preset transparency pattern. Here, the preset transparency pattern may be a window pattern of a preset size which has a transparency pattern format which is reproduced according to a preset transparency rate and is pre-analyzed.

In this case, the image processor 120 selects an adjacent pixel area based on a pixel which is to be currently processed and determines whether the adjacent pixel area corresponds to the window pattern.

The image processor 120 also changes a pixel value of the corresponding pixel area into an average value of pixel values of pixel areas corresponding to the window pattern to perform smoothing processing with respect to the corresponding pixel area.

In general, if an image is printed in an image forming apparatus such as a printer, the image is printed using a halftoning method. Halftoning refers to a method of expressing gradations of contrast with the number of pixels shown in a lattice halftone cell in order to express concentration of contrast or the like in each of the gradations. The lattice halftone cell is seen as not a continuous tone gradation such as a full color printed matter of a dye sublimation printer but as a continuous image without being seen as several pixels at a predetermined distance.

Image data input through an image forming apparatus is expressed as 256 gradations. Accordingly, a halftoning method may be applied to the bitmap data 115, which takes into account that a concentration of a toner used in the image forming apparatus cannot be freely changed like a luminous body such as a computer monitor or the like and only a determination is made as to whether the toner is to be imprinted on a printing paper.

Examples of a method of performing halftoning include screening, error diffusion, dithering, and the like. These are well-known techniques, and thus their detailed descriptions will be omitted.

The output unit 130, such as a printer for example, prints and outputs data, which has been image-processed by the image processor 120, on a recording medium under control of the controller 170. For example, in the case of a laser type image forming apparatus, an organic photoconductor (OPC) surface (not shown) is electrified by a charging unit (not shown), and a latent image is formed in an electrified area by a laser scanning unit (LSU) (not shown). When developing is performed by a developing unit (not shown) in this case, a toner sticks to the latent image and then is transferred to a printing paper by a transferring unit (not shown). The transferred toner is fixed onto the printing paper by a fixing unit (not shown). However, this is merely an exemplary embodiment, and it will be obvious to those skilled in the art that the present image forming apparatus may be applied to an inkjet type.

The user interface unit 140 includes a control key (not shown) through which a user command to control an operation of the image forming apparatus 100 is input and a display window (not shown), such as a liquid crystal display (LCD), which displays a state of the image forming apparatus 100. The user interface unit 140 may be realized as an apparatus, which simultaneously realizes an input and an output, such as a touch pad or the like.

The user interface unit 140 also displays various types of information provided from the image forming apparatus 100, progress states of jobs which are in progress in the image forming apparatus 100, and results of the jobs. A user can check, manage, and control various types of printing jobs, which are performed in the image forming apparatus 100, through the user interface unit 140.

The communication interface unit 150 supports a data communication which is performed with an external device (not shown) through a network. For example, the communication interface unit 150 may be realized in a form which can support a Digital Living Network Alliance (DLNA) network, a local system, a Local Area Network (LAN), an internet network, and the like. In particular, the communication interface unit 150 receives the image, which is generated through the application program or the driver of the host device or the RGB rendering image and which is generated through the emulation and provides the image or the RGB rendering image to the input unit 110.

The input unit 110 and the communication interface unit 150 are shown as separate elements in FIG. 1, but this is merely an exemplary embodiment. Therefore, the communication interface unit 150 may be realized as the input unit 110.

The storage unit 160 may be realized as a storage medium or an external storage medium of the image forming apparatus 100, e.g., a removable disk including a universal serial bus (USB) memory, a storage medium connected to a host, a web server through a network, or the like.

The storage unit 160 stores information necessary to improve an image quality of the image processor 120. In more detail, the storage unit 160 stores various transparency patterns necessary to determine a transparency pattern, which may further undergo a smoothing process, as discussed below. For example, the storage 160 stores a plurality of pieces of preset transparency pattern information in a lookup table (LUT). In more detail, the storage unit 160 stores various types of transparency pattern information in an N×N window format.

The controller 170 controls operations of elements of the image forming apparatus 100 according to various types of preset programs.

In more detail, the controller 170 controls operations of the input unit 110, the image processor 120, the output unit 130, the user interface unit 140, the communication interface unit 150, and the storage unit 160.

In at least one present exemplary embodiment, the above-described functions are controlled through the elements of the image forming apparatus 100, but this is merely an exemplary embodiment. Therefore, the above-described functions may be controlled through a printer driver (not shown) or an application (not shown) of the host device which is connected to the image forming apparatus 100, as described with reference to FIG. 2 below.

Figure 2:
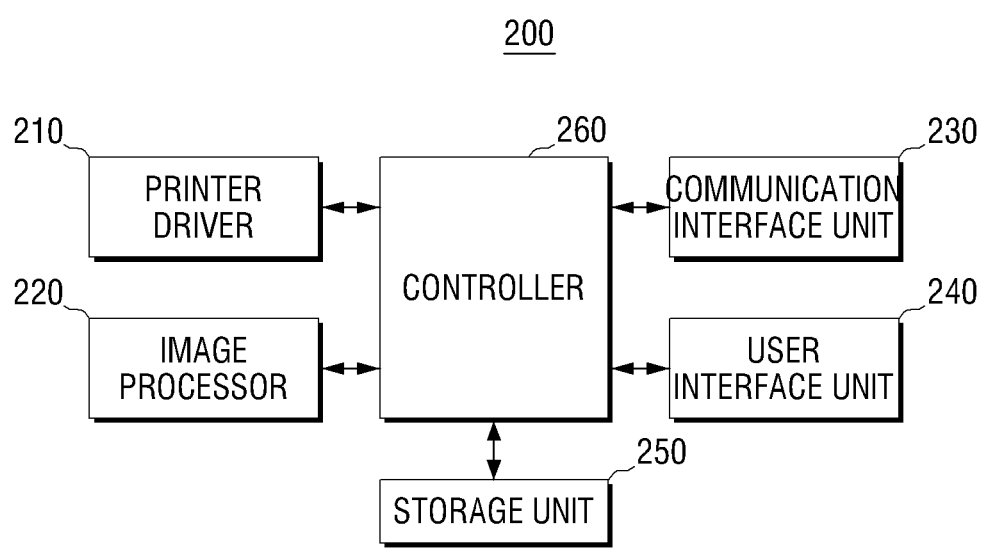
FIG. 2 is a block diagram illustrating a structure of a printing control terminal apparatus according to an exemplary embodiment.

FIG. 2 is a block diagram illustrating a structure of a printing control terminal apparatus 200 according to an exemplary embodiment of the present general inventive concept.

In FIG. 2, a case where functions corresponding to the image forming apparatus 100 of FIG. 1 are performed through the printing control terminal apparatus 200 will be described.

Referring to FIG. 2, the printing control terminal apparatus 200 is connected to the image forming apparatus 100, which outputs document and/or image data, via a communication interface unit 230 as described in greater detail below. The printing control terminal apparatus 200 includes a personal computer (PC), a notebook computer, a personal digital assistant (PDA), a portable multimedia player (PMP), a cellular phone, or the like.

A printer driver 210 includes at least one driver corresponding to at least one language and performs a printing job of the image forming apparatus 100.

In more detail, if a user wants to print a document and/or an image generated by an application program, the printer driver 210 generates printing data in a recognizable printing language in the image forming apparatus 100 in which the user is to perform a printing job.

For example, the printer driver 210 generates an RGB rendering image of image on which image processing is to be performed. Thus, a rendering unit may be the printer driver 210, but is not limited thereto. The printer driver 210 may perform only an handover operation of handing over the document and/or image generated by the application program to a corresponding module so that printing data generating, RGB rendering, and the like are performed by other modules not by the printer driver 210.

An image processor 220 performs image processing with respect to input data under control of a controller 260.

In more detail, the image processor 220 transforms an 8-bit RGB image into a CMYK image through a color transformation and generates the CMYK image as a 1-bit image (a binary image) through halftoning.

The image processor 220 also performs image quality improvement processing with respect to the CMYK image before performing halftoning processing with respect to the CMYK image. In other words, image quality improvement processing and halftoning processing are performed with respect to image data of a CMYK color space which is a color space to be printed, wherein C, M, Y, and K respectively denote cyan, magenta, yellow, and black.

Examples of image quality improvement processing performed by the image processor 200 may include blurring, trapping, sharpening, edge enhancement, object-based halftoning, and the like.

Image quality improvement processing may be applied using an appropriate method according to an attribute of each object included in the image data. Here, the objects may be classified into texts, rasters, and graphics according to their attributes.

In more detail, objects of a scanned document may be classified into texts, rasters, and graphics using a page description language (PDL) or an object classification algorithm, and related information, i.e., information regarding kinds and sizes of the objects, may be generated and used.

For example, the image processor 220 includes a graphic device interface (GDI) and a display driver integrated circuit (IC) (DDI), classifies data received from an application (which generates a command to process data such as text, graphic, and raster images according to characteristics of jobs, programs of which have been designed) into text, graphic, and raster images, and generates information related to kinds and sizes of the text, graphic, and raster images.

In particular, the image processor 220 performs transparency pattern matching with respect to the CMYK image to determine whether the CMYK image includes a transparency pattern and performs smoothing processing with respect to a pixel area including the transparency pattern.

In more detail, the image processor 220 transforms bitmap RGB data into CMYK data, compares pattern formats of pixel areas of the CMYK data with one another, and determines whether a corresponding pixel area includes a preset transparency pattern, based on the comparison result.

The image processor 220 also performs smoothing processing with respect to the corresponding pixel area which has been determined that it includes the preset transparency pattern. Here, the preset transparency pattern may be a window pattern of a preset size, a transparency pattern of which is reproduced according to a preset transparency rate and pre-analyzed.

In this case, the image processor 220 selects an adjacent pixel area based on a pixel, which is to be currently processed, to determine whether the adjacent pixel area corresponds to the window pattern.

The image processor 220 also changes a pixel value of the corresponding pixel area into an average value of pixel values of pixel areas corresponding to the window pattern to perform smoothing processing with respect to the corresponding pixel area.

A communication interface unit 230 is connected to at least one image forming apparatus and provides transformed printing data (transformed document data, selected output option information, etc.) on a printing job to the at least one image forming apparatus. In more detail, the communication interface unit 230 may be formed to connect the printing control terminal apparatus 200 to the at least one image forming apparatus and may be formed as a parallel port, a USB port, a wireless module, or the like.

The communication interface unit 230 performs image processing with respect to an RGB rendering image which is generated through the printer driver 210 or an emulation and transmits the RGB rendering image to the at least one image forming apparatus.

A user interface unit 240 includes a plurality of functional keys through which a user can set or select various functions supported by the printing control terminal apparatus 200 and may be realized as an apparatus, which simultaneously realizes an input and an output like a touch pad, or as a mouse or the like. The user can select document data, which is to be output through the at least one image forming apparatus connected through the communication interface unit 230, through the user interface unit 240 and select an output option which is to be applied to the selected document data.

The user interface unit 240 displays various types of information which is provided from the printing control terminal apparatus 200.

Objects and display formats displayed on the user interface unit 240 are the same as those displayed on the user interface unit 140 of the image forming apparatus 100 of FIG. 1, and thus their detailed descriptions will be omitted herein.

A storage unit 250 stores image forming apparatus information which is received from the communication interface unit 230. The storage unit 250 also temporarily stores the printing data which is generated by the printer driver 210 and pre-stores printing options which are supported in each image forming apparatus model and a scripter which stores supported printing language information and the like. In addition, the storage unit 250 may store predetermined transparency patterns used to detect a transparent area of an image, as discussed further below.

The storage unit 250 temporarily stores the printing data on which the image processor 220 has performed the image processing.

In particular, the storage unit 250 stores information that may be used by the image processor 220. In more detail, the storage unit 250 stores various transparency patterns necessary to determine a transparency pattern used in a smoothing process, which is discussed further below. For example, the storage unit 250 stores a plurality of pieces of preset transparency pattern information in a LUT. In more detail, the storage unit 250 stores various types of transparency pattern information in an N×N window format.

A controller 260 controls elements necessary to perform a printing job according to an output option selected in the image forming apparatus, using the printer driver 210.

In more detail, the controller 260 controls operations of the printer driver 210, the image processor 220, the communication interface unit 230, the user interface unit 240, and the storage unit 250.

It will be obvious to those skilled in the art that the printing control terminal apparatus 200 may perform a configuration applied in the image forming apparatus 100 of FIG. 1 within a possible image forming job, and thus its detailed description will be omitted.

As described above, according to the present general inventive concept, a determination may be made as to whether data that an application program hands over to a printer driver includes a transparency pattern which may deteriorate an image quality. To reduce the deterioration, a smoothing process of the transparency pattern may be performed according to the determination result to improve an image quality of final printing data, as discussed further below.

Figure 3:
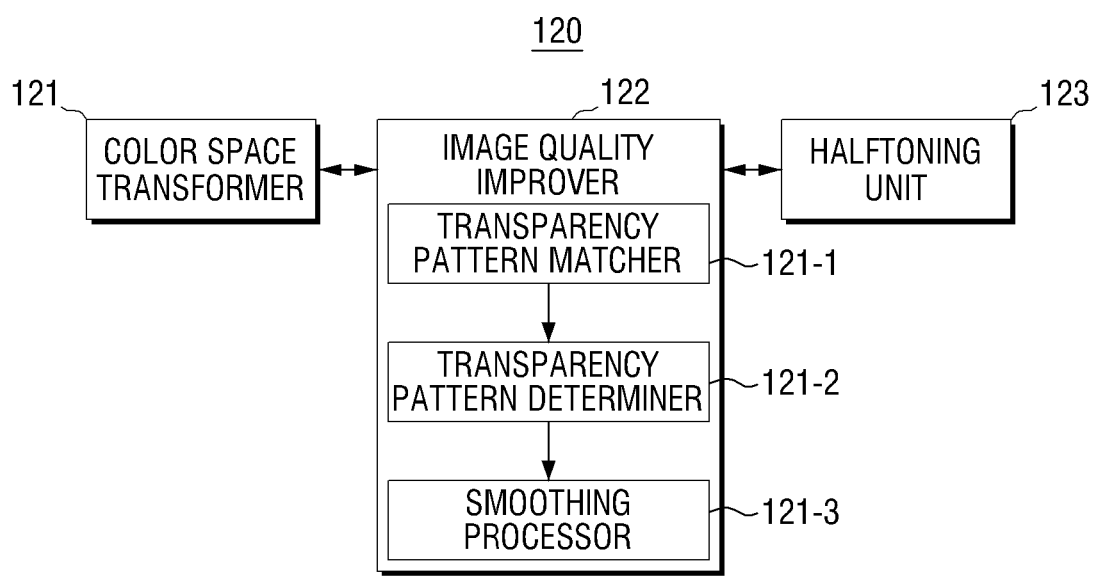
FIG. 3 is a block diagram illustrating a structure of an image processor according to an exemplary embodiment.

FIG. 3 is a block diagram illustrating a structure of an image processor 120 according to an exemplary embodiment.

Referring to FIG. 3, the image processor 120 includes a color space transformer 121, an image quality improver 122, and a halftoning unit 123. Here, the image processor 120 may be the image processor 120 or 220 shown in FIG. 1 or 2 and thus may be described as the image processor 120 of FIG. 1 for convenience of explanation.

The color space transformer 121 transforms a bitmap image of a rendered RGB color space into CMYK data which can be printed in an image forming apparatus.

The image quality improver 122 performs image quality improvement using CMYK of a transformed color space. Here, sharpening to improve details of an image and/or blurring to remove noise may be performed as image quality improvement.

The image quality improver 122 also performs a transparency pattern determination and smoothing processing. Therefore, the image quality improver 122 includes a transparency pattern matcher 121-1, a transparency pattern determiner 121-2, and a smoothing processor 121-3.

The transparency pattern matcher 121-1 receives the CMYK data transformed from the color space transformer 121. In general, CMYK has image information of an 8 bit depth for each color. In at least one present exemplary embodiment, a gray image is described for convenience for explanation. However, actual applied colors may be respectively independently executed by the same algorithm method.

The transparency pattern determiner 121-2 determines whether a corresponding pixel area includes a preset transparency pattern, based on the matching result of the transparency pattern matcher 121-1.

FIG. 4 is a view illustrating transparency pattern matching and determining methods according to an exemplary embodiment.

The transparency pattern matcher 121-1 selects an adjacent pixel area based on a pixel position which is to be currently processed and analyzes whether the adjacent pixel area includes a specific transparency pattern in order to determine whether a current pixel is an image formed by a transparency pattern. In this case, the number of adjacent pixels may be variously selected, and a 5×5 window may be described as an example of the number of adjacent pixels in the present exemplary embodiment.

Also, in order to further describe the present general inventive concept, if a PowerPoint application program of Microsoft is used, an object, a transparency of which has been set, is expressed in a 1×1 pattern format in a bitmap. However, this is merely an exemplary embodiment, and it will be obvious to those skilled in the art that the present general inventive concept may be applied to all types of application programs which generate images including transparency patterns.

Figure 5A:
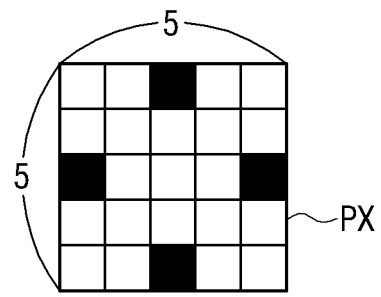
FIGS. 5A through 5C are views illustrating pre-stored transparency pattern information according to exemplary embodiments.
Figure 5B:
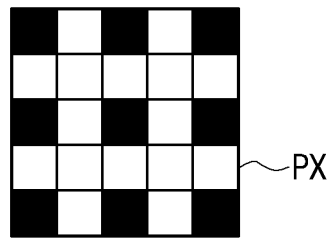
Figure 5C:
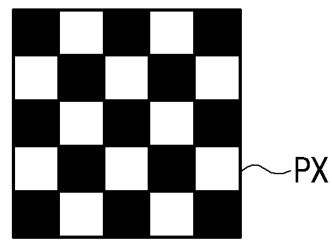

Before transparency pattern matching and determining are performed, formats of patterns respectively reproduced according to transparency rates may be pre-analyzed, and then information on the patterns may be stored in a LUT. FIGS. 5A through 5C are views illustrating pre-stored transparency pattern information according to exemplary embodiments.

For example, FIGS. 5A, 5B, and 5C respectively illustrate pattern formats of a 5×5 pixel (px) which are expressed, pre-analyzed, and stored when a transparency is set to 85%, 75%, and 50%, respectively.

If a determination is to be made as to whether a corresponding image that has been converted into a bitmap data 115 includes a transparency pattern, preset transparency pattern information may be compared with the corresponding bitmap data 115 to perform the determination.

Referring to FIG. 4, bitmap data 115 converted from an image generated by a host device (not shown) may include an upper object 124 and a lower object 125, each including a plurality of pixels. The plurality of pixels may be divided into a plurality of pixel areas to determine whether a portion of the bitmap data 115 is transparent. As illustrated in FIG. 4, for example, area "A" does not include patterns which correspond to patterns stored in a LUT, and area "B" includes patterns which correspond to patterns of FIG. 5C stored in the LUT. Therefore, it may be determined that the area "A" does not have a transparency, and the area "B" includes a transparency.

Smoothing processing may be performed with respect to the area "B" of the bitmap data 115 that has the transparency.

The smoothing processor 121-3 performs smoothing processing with respect to the corresponding pixel area that has been determined to include the preset transparency pattern by the transparency pattern determiner 121-2. A basic averaging method may be used as smoothing processing. Equation 1 below indicates an example of performing averaging based on adjacent 5×5 pixels (px).

The term "px(2,2)" in Equation 1 below indicates position information of a current pixel, and the others indicate pixel position information of adjacent 5×5 pixels.

$$SmoothingOut = \\ (px(0,0) + px(0,1) + px(0,2) + px(0,3) + px(0,4) + px(1,0) + \\ px(1,1) + px(1,2) + px(1,3) + px(1,4) + px(2,0) + \\ px(2,1) + px(2,2) + px(2,3) + px(2,4) + px(3,0) + \\ px(3,1) + px(3,2) + px(3,3) + px(3,4) + px(4,0) + \\ px(4,1) + px(4,2) + px(4,4) + px(4,4))/25 \qquad (1)$$

wherein "px" denotes a pixel.

The halftoning unit 123 transforms printing data, an image quality of which has been improved, into final printable binary image data. In other words, the halftoning unit 123 expresses an image using only binary information of toner on/off. For example, a screening method using a screen table matrix which is mainly used in a laser printer may be used as a halftoning method.

Figure 6A:
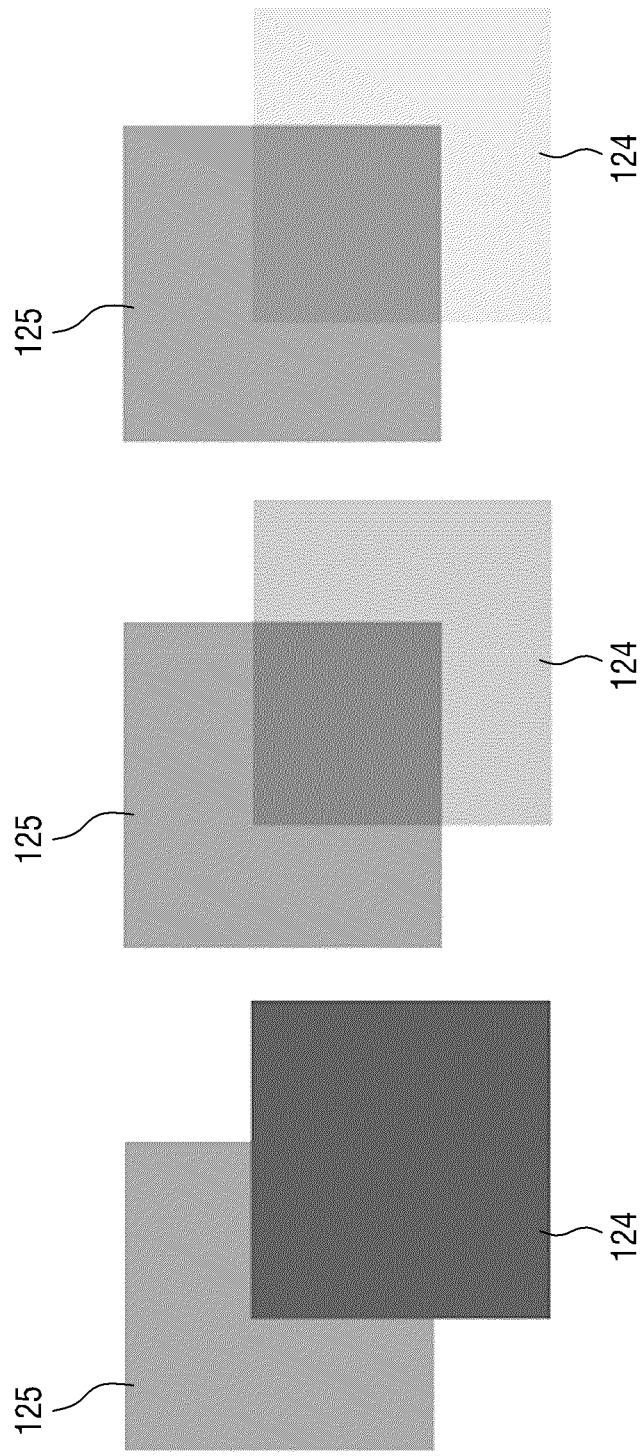
FIGS. 6A through 6C are views illustrating transparency reproduction characteristics related to the present general inventive concept.
Figure 6B:
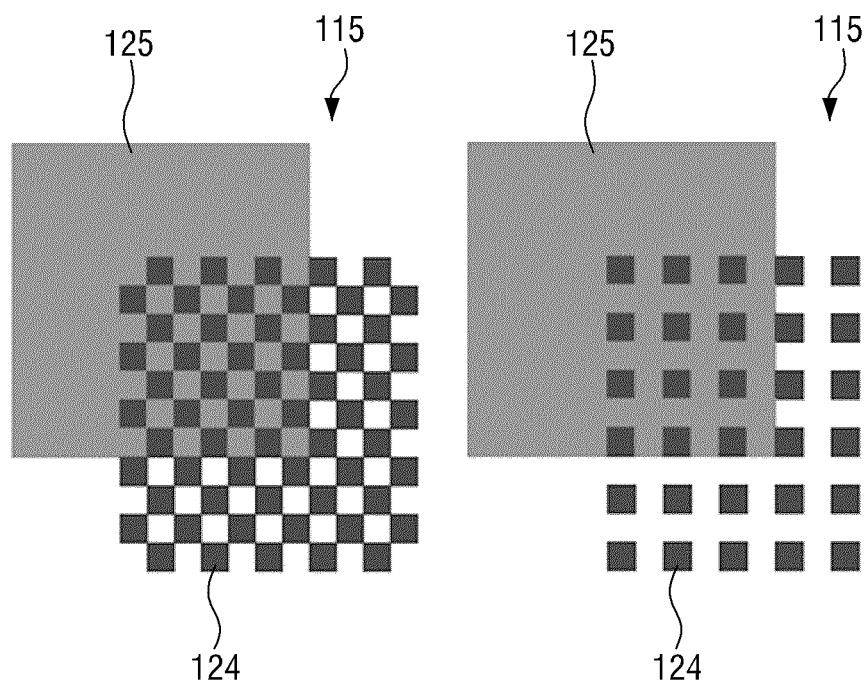
Figure 6C:
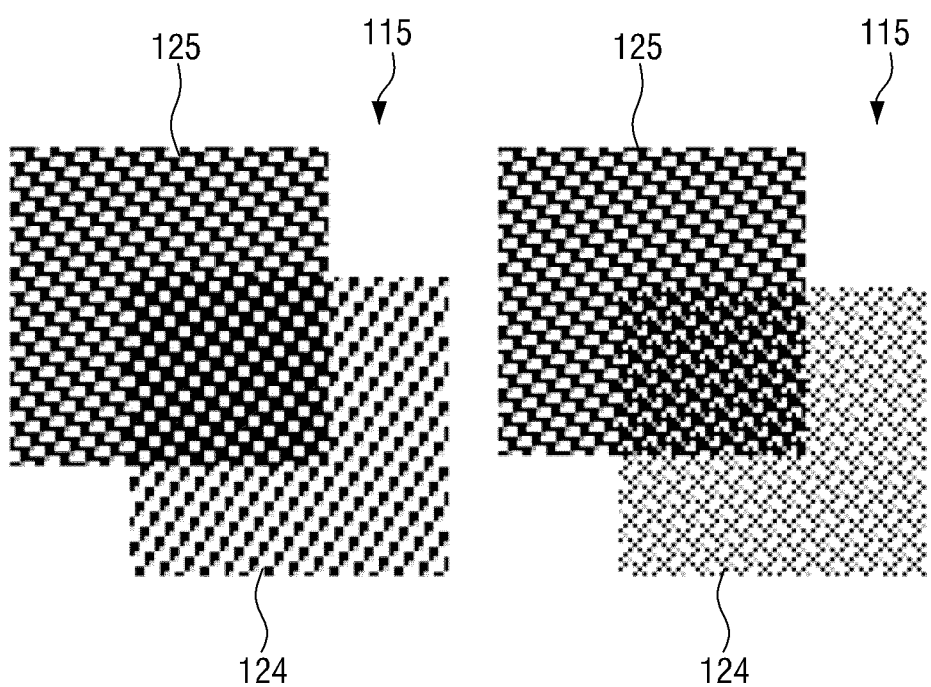

FIGS. 6A to 6C are views illustrating transparency reproduction characteristics related to the present general inventive concept.

FIG. 6A illustrates a general transparency reproduction characteristic.

The first view of FIG. 6A illustrates two box objects, i.e., an upper object 124 and a lower object 125, transparencies of which are not set. In this case, a color of an overlapping area has a color of an upper object 124.

The second view of FIG. 6A illustrates two box objects, i.e., an upper box 124 and a lower box 125, in which a transparency of an upper object 124 is set to 50%. In this case, brightness of the upper object 124 is determined according to a transparency rate, and thus an overlapping area is expressed with a transparency result value, thereby making a lower object 125 transparent.

The third view of FIG. 6A illustrates two box objects, i.e., an upper object 124 and a lower object 125, in which a transparency of an upper object 124 is set to 75%. In this case, an overlapping area is expressed in a color slightly closer to a color of a lower object 125, thereby reproducing a transparency.

Here, a final output color of an area expressed with a transparency rate is determined by blending, and a monitor uses α-blending in each pixel position. Equation 2 below shows a α-blending equation.

Final Color=(α*Upper Object)+((1−α)*Lower Object)  (2)

In the case of the second view of FIG. 6A, the upper object 124 includes an upper graphic value is 64, and the lower object 125 includes a lower graphic value 128. Here, if a transparency of an upper graphic is 50% (α=0.5), a final color of an overlapping area is 96 due to the transparency. Equation 3 below shows an example of this.

96=(0.5*64)+(0.5*128)  (3)

The monitor calculates a final color of an object, a transparency of which is set, using a α-blending method. However, some application programs apply differently a method of rendering a transparency between the monitor and a printer. The present general inventive concept may be applied to cases which use these application programs.

FIG. 6B illustrates examples of transparencies reproduced in an image forming apparatus such as a printer.

The examples shown in FIG. 6B are rendering results before graphics generated on a monitor are printed through a printer apparatus. In the case of FIG. 6B, α-blending is performed in each pixel position, and level values of the pixels are determined. However, if printing is performed in an image forming apparatus, transparencies are determined depending on whether pixels of lower objects 125 and upper objects 124 having specific pattern formats as shown in FIG. 6B have been activated.

The first view of FIG. 6B illustrates two box objects each having a transparency rate which is set to 50%.

More specifically, ½ of pixels of an upper object 124 each have a value of the upper object 124, and the remaining pixels of the upper object 124 each have a value of a lower object 125. In other words, half of pixels of the upper object 124 each have the value of the upper object 124, and the other half of the upper object 124 each have the value of the lower object 125. In this case, a transparency of 50% which is set by a user is reproduced.

The second view of FIG. 6B illustrates two box objects each having a transparency rate which is set to 75%.

¼ of pixels each have a color of an upper object 124, and ¾ of the pixels each have a value of a lower object 125 in order to reproduce the transparency to 75%.

In other words, if printing is performed through a printer apparatus, an application program of a host device hands over pattern information to an image processor of the image forming apparatus to vary the number of remaining pixels of an upper object 124 according to a transparency rate. Color information that pertains to an object's transparency rate does not go through α-blending but is conveyed as a pattern format to the image processor, and then the pattern format is rendered by the image processor so as to reproduce a transparency.

FIG. 6C illustrates results of performing screening simulations with respect to the results of α-blending of FIG. 6A.

The results of the screening simulations appear in repeated pattern formats due to a characteristic of a used screening table, and the repeated pattern formats are expressed with lines per inch (LPI) and Angle.

The present exemplary embodiment uses a screen having a 166LPI and an angle of 56°.

The first view of FIG. 6C illustrates a desired binary result which is obtained by performing the screening simulation.

The second view of FIG. 6C illustrates a binary result which is obtained by performing the screening simulation with respect to a transparency reproduction result using a pattern. Differently from the first view of FIG. 6C, the second view of FIG. 6C illustrates a screen table which is deteriorated and reproduced as another pattern format not as a desired binary format. This occurs due to a specific pattern used to reproduce a transparency and an overlap between LPI and Angle of the screen table. This phenomenon is referred to as a "moire."

Figure 7A:
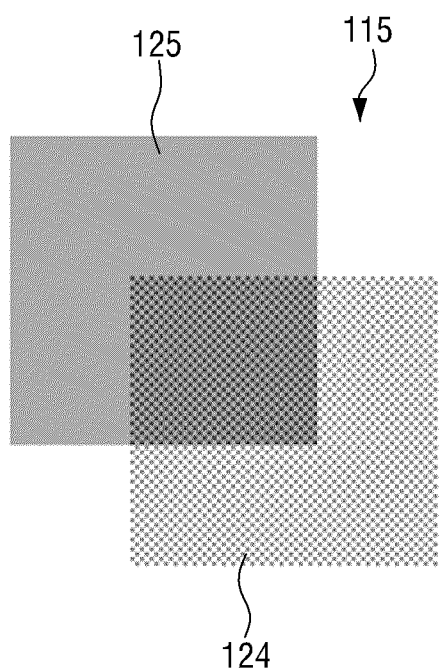
FIGS. 7A through 7C are views illustrating results of halftoning performed after smoothing is performed with respect to a transparency original, according to exemplary embodiments.
Figure 7B:
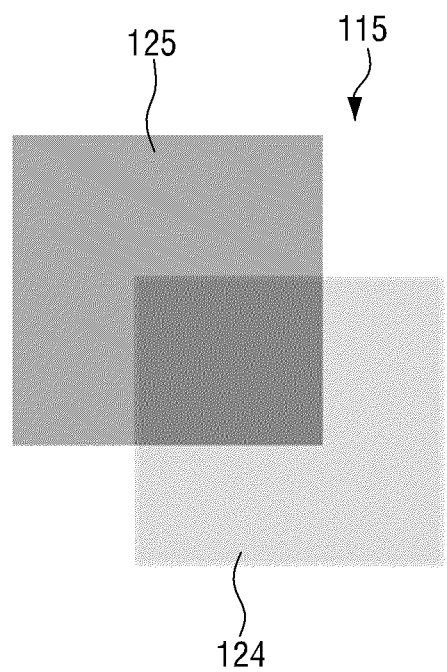
Figure 7C:
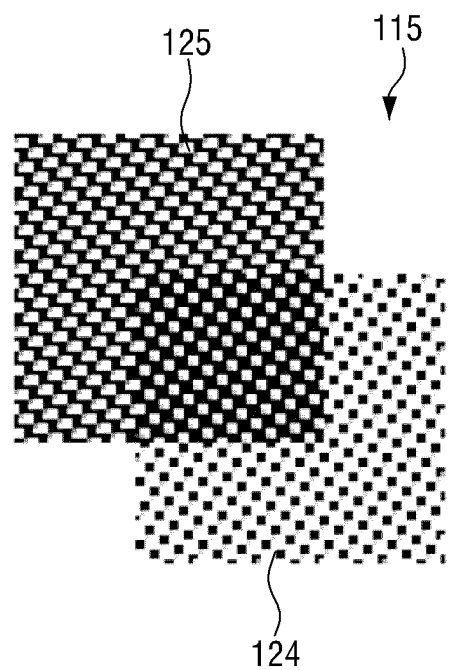

FIGS. 7A through 7C are views illustrating results which are obtained by performing smoothing and then halftoning with respect to a transparency original, according to an exemplary embodiment.

FIG. 7A illustrates the result which is obtained by performing smoothing and then halftoning with respect to the transparency original.

FIG. 7B illustrates the result which is obtained by performing smoothing with respect to a transparency area matched by transparency pattern matching.

FIG. 7C illustrates images which are generated by performing smoothing and then halftoning with respect to images. An image on which smoothing has been performed according to the present general inventive concept shows a similar result to the format of the first view of FIG. 6C which is obtained by simulating an image using α-blending.

FIG. 8 is a flowchart illustrating an image forming method of an image forming apparatus according to an exemplary embodiment.

Referring to FIG. 8, printing data, i.e., an image is input (S810). The input printing data is transformed into bitmap data 115 (S820).

A determination is made as to whether the bitmap data 115 includes a transparency pattern (S830). If it is determined that the bitmap data 115 includes the transparency pattern (S830), smoothing processing is performed with respect to the bitmap data 115 (S840).

The bitmap data 115 on which smoothing processing has been performed is output (S850).

A plurality of pieces of preset transparency pattern information may be stored in a LUT of a storage unit 160/250.

The performance of the smoothing processing (S840) may include, respectively, comparing pattern formats of predetermined pixel areas of the bitmap data 115 with the preset transparency pattern information stored in the LUT, determining whether a corresponding pixel area includes a preset transparency pattern based on the comparison result, and performing smoothing processing with respect to the corresponding pixel area of the bitmap data 115 which has been determined that it includes the preset transparency pattern.

Here, the preset transparency pattern information may be a window pattern of a preset size which has a transparency pattern format which is reproduced according to a preset transparency rate and is pre-analyzed.

Also, an adjacent pixel area may be selected based on a pixel which is to be currently processed to determine whether the adjacent pixel area corresponds to the window pattern.

In this case, smoothing processing may be an operation which is to change a pixel value of a corresponding pixel area into an average value of pixel values of pixel areas corresponding to the window pattern.

Bitmap RGB data may be transformed in to CMYK data, and transparency pattern matching may be performed with respect to each channel of the CMYK data.

FIG. 9 is a flowchart illustrating an image forming method of a host device according to an exemplary embodiment.

Referring to FIG. 9, input printing data, i.e., an image, is transformed into bitmap data 115 (S910). A determination is made as to whether the bitmap data 115 includes a transparency pattern (S920).

If it is determined that the bitmap data 115 includes the transparency data (S920), smoothing processing is performed with respect to the bitmap data (S930).

The bitmap data 115 on which smoothing processing has been performed is transmitted to an image forming apparatus to perform printing (S940).

A plurality of pieces of preset transparency pattern information may be stored in a LUT of a storage unit 160/250.

In this case, pattern formats of pixel areas of the bitmap data 115 may be respectively compared with the plurality of pieces of preset transparency pattern information, and a determination may be made as to whether a corresponding pixel area of the bitmap data 115 includes the preset transparency pattern, based on the comparison result.

Here, smoothing processing may be performed with respect to the corresponding pixel which has been determined to include the preset transparency pattern.

The preset transparency pattern information may be a window pattern of a preset size which has a transparency pattern format which is reproduced according to a preset transparency rate and is pre-analyzed.

An adjacent pixel area may be selected based on a pixel which is to be currently processed to determine whether the adjacent pixel area corresponds to the window pattern.

In this case, smoothing processing may be an operation which is to change a pixel value of a corresponding pixel into an average value of pixel values of pixel areas corresponding to the window pattern.

Bitmap RGB data may be transformed into CMYK data, and transparency pattern matching may be performed with respect to each channel of the CMYK data.

In at least one exemplary embodiment of the present general inventive concept, printing is performed through an application program using a host device such as a PC or the like. However, the present general inventive concept may be equally applied to direct printing which is performed through a storage medium storing an image which is to be printed.

As described above, according to the present general inventive concept, when performing printing through a printer, an image quality deterioration, which may occur in an image printed according to a transparency set in an application program, can be reduced. Accordingly, an image quality of a finally printed matter can be improved.

Although a few exemplary embodiments of the present general inventive concept have been shown and described, it would be appreciated by those skilled in the art that changes may be made in these embodiments without departing from the principles and spirit of the general inventive concept, the scope of which is defined in the claims and their equivalents.

What is claimed is:

1. An image forming apparatus, comprising:
   an input unit to receive printing data;
   a rendering unit to transform the printing data into bitmap data;
   a storage unit to store a plurality of pieces of preset transparency pattern information in a lookup table (LUT);
   an image processor to compare the bitmap data with a preset transparency pattern having a plurality of different preset transparency rates to represent various amounts of transparency, and if it is determined that the bitmap data comprises a transparency pattern matching the preset transparency pattern having one of the preset transparency rates, to perform smoothing processing with respect to the bitmap data at the one of the preset transparency rates; and
   an output unit to output the bitmap data processed by the image processor,
   wherein the image processor comprises:
   a transparency pattern matcher to respectively compare pattern formats of predetermined pixel areas of the bitmap data with the plurality of pieces of preset transparency pattern information;
   a transparency pattern determiner to determine whether a corresponding pixel area comprises the transparency pattern matching the preset transparency pattern among the plurality of pieces of preset transparency pattern information, based on the comparison result; and
   a smoothing processor to perform the smoothing processing with respect to the corresponding pixel area which has been determined that it comprises the preset transparency pattern.

2. The image forming apparatus as claimed in claim 1, wherein the preset transparency pattern information is a window pattern of a preset size which has a transparency pattern format which is reproduced according to the one preset transparency rate and is pre-analyzed,
   wherein the transparency pattern matcher selects an adjacent pixel area based on a pixel which is to be currently processed to determine whether the adjacent pixel area corresponds to the window pattern.

3. The image forming apparatus as claimed in claim 2, wherein the smoothing processing is to change a pixel value of the corresponding pixel area into an average value of pixel values of pixel areas corresponding to the window pattern.

4. The image forming apparatus as claimed in claim 1, wherein the image processor further comprises:
   a color space transformer to transform the bitmap data of an RGB color space into data of a CMYK color space,
   wherein the transparency pattern matcher performs transparency pattern matching with respect to each channel of the data of the CMYK color space.

5. A printing control terminal apparatus which is connected to an image forming apparatus, comprising:
   a rendering unit to transform input printing data into bitmap data;
   a storage unit to store a plurality of pieces of preset transparency pattern information in a lookup table (LUT);
   an image processor to compare the bitmap data with a preset transparency pattern having a plurality of different preset transparency rates to represent various amounts of transparency, and if it is determined that the bitmap data comprises a transparency pattern matching the preset transparency pattern having one of the preset transparency rates, to perform smoothing processing with respect to the bitmap data at the one of the preset transparency rates; and
   a communication interface unit to transmit the bitmap data processed by the image processor to the image forming apparatus,
   wherein the image processor comprises:
   a transparency pattern matcher to respectively compare pattern formats of predetermined pixel areas of the bitmap data with the plurality of pieces of preset transparency pattern information;
   a transparency pattern determiner to determine whether a corresponding pixel area comprises the transparency pattern matching the preset transparency pattern among the plurality of pieces of preset transparency pattern information, based on the comparison result; and
   a smoothing processor to perform the smoothing processing with respect to the corresponding pixel area which has been determined that it comprises the transparency pattern.

6. The printing control terminal apparatus as claimed in claim 5, wherein the preset transparency pattern information is a window pattern of a preset size which has a transparency pattern format which is reproduced according to a preset transparency rate and is pre-analyzed, wherein the transparency pattern matcher selects an adjacent pixel area based on a pixel which is to be currently processed to determine whether the adjacent pixel area corresponds to the window pattern.

7. The printing control terminal apparatus as claimed in claim 6, wherein the smoothing processing is to change a pixel value of the corresponding pixel area into an average value of pixel values of pixel areas corresponding to the window pattern.

8. An image forming method of an image forming apparatus, comprising:

receiving printing data into an input unit;

transforming the printing data into bitmap data by a rendering unit;

storing a plurality of pieces of preset transparency pattern information in a lookup table (LUT) of a storing unit;

comparing the bitmap data with a preset transparency pattern having a plurality of different preset transparency rates to represent various amounts of transparency, and if it is determined that the bitmap data comprises a transparency pattern matching the preset transparency pattern having one of the preset transparency rates, performing smoothing processing with respect to the bitmap data at the one of the preset transparency rates; and outputting the bitmap data on which the smoothing processing has been performed, wherein the performance of the smoothing processing comprises:

respectively comparing pattern formats of predetermined pixel areas of the bitmap data with the plurality of pieces of preset transparency pattern information;

determining whether a corresponding pixel area comprises the transparency pattern matching the preset transparency pattern among the plurality of pieces of preset transparency pattern information, based on the comparison result; and performing smoothing processing with respect to the corresponding pixel area which has been determined that it comprises the transparency pattern.

9. The image forming method as claimed in claim 8, wherein the preset transparency pattern information is a window pattern of a preset size which has a transparency pattern format which is reproduced according to a preset transparency rate and is pre-analyzed, wherein the comparison comprises selecting an adjacent pixel area based on a pixel which is to be currently processed to determine whether the adjacent pixel area corresponds to the window pattern.

10. The image forming method as claimed in claim 9, wherein the smoothing processing is to change a pixel value of the corresponding pixel area into an average value of pixel values of pixel areas corresponding to the window pattern.

11. The image forming method as claimed in claim 8, wherein the performance of the smoothing processing comprises transforming bitmap RGB data into CMYK data, wherein the comparison comprises performing transparency pattern matching with respect to each channel of the CMYK data.

12. An image forming method of a printing control terminal apparatus which is connected to an image forming apparatus, comprising:

transforming input printing data into bitmap data;

storing a plurality of pieces of preset transparency pattern information in a lookup table (LUT);

comparing the bitmap data with a preset transparency pattern having a plurality of different preset transparency rates to represent various amounts of transparency, and if it is determined that the bitmap data comprises a transparency pattern matching the preset transparency pattern having one of the preset transparency rates, performing smoothing processing with respect to the bitmap data at the one of the preset transparency rates; and transmitting the bitmap data on which the smoothing processing has been performed to the image forming apparatus, wherein the performance of the smoothing processing comprises:

respectively comparing pattern formats of predetermined pixel areas of the bitmap data with the plurality of pieces of preset transparency pattern information;

determining whether a corresponding pixel area comprises the transparency pattern matching the preset transparency pattern among the plurality of pieces of preset transparency pattern information, based on the comparison result; and performing smoothing processing with respect to the corresponding pixel area which has been determined that it comprises the transparency pattern.

13. The image forming method as claimed in claim 12, wherein the preset transparency pattern information is a window pattern of a preset size which has a transparency pattern format which is reproduced according to a preset transparency rate and is pre-analyzed, wherein the comparison comprises selecting an adjacent pixel area based on a pixel which is to be currently processed to determine whether the adjacent pixel area corresponds to the window pattern.

14. The image forming method as claimed in claim 13, wherein the smoothing processing is to change a pixel value of the corresponding pixel area into an average value of pixel values of pixel areas corresponding to the window pattern.

15. An image forming apparatus, comprising:

an image input unit that coverts image data into bitmap data including an upper object and a lower object each having a plurality of pixels to be printed and receives pattern information corresponding to at least one of the upper and lower objects;

a storage unit that stores a plurality of prestored pattern information; and an image processor to compare the received pattern information with the prestored pattern information containing a preset predetermined transparency pattern having a plurality of different preset transparency rates to represent various amounts of transparency, and if it is determined the received pattern information matches the preset predetermined transparency pattern having one of the preset transparency rates in the prestored pattern information that a transparency area having the received pattern information exists, to adjust a transparency of a predetermined number of pixels of the upper object based on the received pattern information at the one of the preset transparency rates.

16. The image forming apparatus of claim 15, wherein the image processor performs smoothing the transparent area after applying the pre-stored pattern information and prints the smoothed binary data.

17. The image forming apparatus of claim 16, wherein the image processor performs the smoothing by averaging pixel values of adjacent pixels having a predetermined pattern format and performs halftoning of the smoothed binary data.

18. An image forming method of an image forming apparatus, comprising:
- receiving bitmap data including a plurality of pixels from an externally connected device;
- determining whether an area of pixels among the plurality of pixels is a patterned area including a pattern;
- determining the patterned area is transparent if the pattern of the patterned area matches a pre-stored transparency pattern having one of various different preset transparency rates stored in a storage unit of the image forming apparatus;
- performing a smoothing process on the patterned area at the one of the preset transparency rates; and
- printing the bitmap data after performing the smoothing process.

\* \* \* \* \*

UNITED STATES PATENT AND TRADEMARK OFFICE
CERTIFICATE OF CORRECTION

| | | |
|---|---|---|
| PATENT NO. | : 9,001,381 B2 | Page 1 of 1 |
| APPLICATION NO. | : 13/231369 | |
| DATED | : April 7, 2015 | |
| INVENTOR(S) | : Hae-kee Lee | |

It is certified that error appears in the above-identified patent and that said Letters Patent is hereby corrected as shown below:

In the Claims

Column 18, Lines 66-67, In claim 16, delete "prints the" and insert -- prints --, therefor.

Signed and Sealed this
Twenty-first Day of July, 2015

Michelle K. Lee
*Director of the United States Patent and Trademark Office*